(12) United States Patent
Chuang et al.

(10) Patent No.: US 8,947,008 B2
(45) Date of Patent: Feb. 3, 2015

(54) DRIVER CIRCUIT AND RELATED ERROR DETECTION CIRCUIT AND METHOD

(75) Inventors: Yu-Chun Chuang, Hsinchu County (TW); Ruei-Iun Pu, Hsinchu (TW)

(73) Assignee: Silicon Touch Technology Inc., Science-Based Industrial Park, Hsin-Chu (TW)

( * ) Notice: Subject to any disclaimer, the term of this patent is extended or adjusted under 35 U.S.C. 154(b) by 309 days.

(21) Appl. No.: 13/593,534

(22) Filed: Aug. 24, 2012

(65) Prior Publication Data

US 2013/0057175 A1 Mar. 7, 2013

(30) Foreign Application Priority Data

Sep. 1, 2011 (EP) ..................................... 11007116

(51) Int. Cl.
*H05B 37/00* (2006.01)
*H03K 5/22* (2006.01)

(52) U.S. Cl.
USPC .............................. 315/240; 315/291; 327/73

(58) Field of Classification Search
None
See application file for complete search history.

(56) References Cited

U.S. PATENT DOCUMENTS

| 5,796,767 | A | 8/1998 | Aizawa | |
|---|---|---|---|---|
| 6,144,222 | A * | 11/2000 | Ho | .................................. 326/82 |
| 6,194,967 | B1 | 2/2001 | Johnson | |
| 6,337,596 | B1 | 1/2002 | Shimozono | |
| 6,466,080 | B2 | 10/2002 | Kawai | |
| 7,327,170 | B2 * | 2/2008 | Omori et al. | .................. 327/108 |
| 7,394,309 | B1 | 7/2008 | Potanin | |
| 7,432,696 | B1 | 10/2008 | De Stasi | |
| 8,148,914 | B2 * | 4/2012 | Lindeberg et al. | ............ 315/291 |
| 8,305,006 | B2 * | 11/2012 | Ishii et al. | ..................... 315/291 |
| 2006/0028150 | A1 | 2/2006 | Vitunic | |
| 2006/0055465 | A1 | 3/2006 | Lin | |
| 2006/0097759 | A1 * | 5/2006 | Omori et al. | .................. 327/108 |
| 2007/0205823 | A1 | 9/2007 | Cho | |
| 2008/0042729 | A1 | 2/2008 | Huang | |
| 2008/0068066 | A1 * | 3/2008 | Mittal | ............................ 327/535 |
| 2009/0066263 | A1 * | 3/2009 | Ishii et al. | ..................... 315/291 |
| 2010/0102731 | A1 | 4/2010 | Lin | |
| 2010/0164396 | A1 * | 7/2010 | Lindeberg et al. | ............ 315/291 |
| 2012/0146514 | A1 * | 6/2012 | Jeong | ............................ 315/122 |

FOREIGN PATENT DOCUMENTS

| CN | 1913736 A | 2/2007 |
|---|---|---|
| JP | 2000201032 A | 7/2000 |
| JP | 2003124751 A | 4/2003 |
| TW | 200606795 | 2/2006 |

* cited by examiner

*Primary Examiner* — Crystal L Hammond
(74) *Attorney, Agent, or Firm* — Winston Hsu; Scott Margo

(57) ABSTRACT

A low output voltage driver circuit for a light-emitting device is provided according to exemplary embodiments of the present invention. Also, an offset voltage cancellation and/or level shifter is incorporated into the driver circuit to increase the accuracy of the driving current. In addition, an error detection circuit and method are employed in order to adaptively detect the minimum output voltage of the inventive driver circuit.

8 Claims, 15 Drawing Sheets

DRIVER CIRCUIT AND RELATED ERROR DETECTION CIRCUIT AND METHOD

BACKGROUND OF THE INVENTION

1. Field of the Invention

The present invention relates generally to a driver circuit, and more particularly, to a low output voltage driver circuit for driving a light-emitting device and a related error detection circuit.

2. Description of the Prior Art

A traditional constant current driver, as shown in FIG. 1, is generally employed for generating a driving current for driving a load device. The current driver, especially a light-emitting diode (LED) driver, usually requires high output impedance. High output impedance can be obtained either by decreasing channel length modulation (increasing the length of the driver MOSFET) or by cascading the driver (which is illustrated in FIG. 2). The former one trade-offs between the current accuracy and the circuit area, and thus this is not an effective way of obtaining high output impedance since high accuracy trades off with the slew rate. The later one employs negative feedback loop to increase the output impedance by a factor of approximately 2+gm*ro. In the case of negative feedback loop, the output impedance is increased through the gain loop, so that devices (MOSFETs) having shorter channel length may be used. However, this type of circuit configuration will not operate satisfactorily when the output voltage of the current driver is quite low. In addition, a current mirror circuit configuration having an active feedback is disclosed by U.S. Pat. No. 6,194,967 to Johnson et al. As disclosed, an operational amplifier is utilized in the current mirror circuit configuration such that the corresponding voltages at terminals or ports of the disclosed current mirror circuit configuration are substantially identical. However, the output part of the disclosed current mirror circuit configuration consists of two cascoded transistors, and these two cascoded transistors increase the output voltage level, leading to the increasing of power consumption. Additionally, a large driver area due to cascoded transistor results large parasitic capacitance loading thus reduces slew rate. Moreover, when the cascoded transistors are operation in triode region, it is not just ameliorates the effect due to variation of threshold voltage as described in the prior art. Further, it disadvantageously aggravates variation of the output current caused by the output voltage. As a consequence, the cascoded transistors cannot provide the output current with high accuracy. Even though the current mirror configuration can control the gate voltages precisely, it fails to provide the output current with high accuracy to the load device.

Therefore, there are still some shortcomings in the traditional design of the current driver that require to be improved.

SUMMARY OF THE INVENTION

In view of the above, the present invention provides a low output voltage driver circuit. More specifically, the present invention not only utilizes an active component (e.g. amplifier) into a feedback loop of inventive the driver circuit, but also remains the output voltage level. The active component can increase the accuracy of the driving current by maintaining the corresponding voltage of each node/end of the transistors of the driving circuit (e.g. current mirror) in consistency. Hence, the reference current inputted to the current mirror can be precisely mirrored to generate the driving current. Further, the inventive circuit also remains the output voltage level to be within a quite low range so that the power consumption of the driver circuit is well controlled. Besides, the present invention further incorporates an offset cancellation and/or a level shifter into the driver circuit in order to enhance the performance of the amplifier. As a result, the present invention generates the driving current with the highest accuracy.

The present invention also provides an error detection circuit for monitoring the operation normality of the driver circuit, which is accomplished by detecting an output voltage of the driver circuit.

According to one exemplary embodiment of the present invention, an inventive driver circuit for driving a light-emitting device comprises a current mirror and an amplifier. The current mirror has a first transistor and a second transistor, each of which has a first end, a second end, and a control end, wherein the first transistor is configured to receive a reference current at the first end of the first transistor, and the second transistor is configured to generate a driving current at the first end of the second transistor. In addition, the first end of the second transistor is directly connected to the light-emitting device. The amplifier has a first input terminal, a second input terminal, and an output terminal. The first input terminal is coupled to the first end of the first transistor while the second input terminal is coupled to the first end of the second transistor. The output terminal is coupled to the control ends of the first and second transistors.

According to another exemplary embodiment of the present invention, an error detection circuit for a driver circuit comprises: a reference voltage generation circuit and a comparator. Wherein, the driver circuit has at least a first transistor, and a first end of the first transistor outputs a driving current. The reference voltage generation circuit comprises: a second transistor and a reference current source. The second transistor has a first end, a second end and a control end. The control end of the second transistor is coupled to a supply voltage (e.g. VDD of power supply) of the driver circuit. The reference current source is coupled to the first end of the second transistor, and configured to provide a reference current to the second transistor. The comparator has a first input terminal, a second input terminal and an output terminal. The first input terminal is coupled to the first end of the first transistor while the second input terminal is coupled to the first end of the second transistor. The comparator is configured to compare a voltage level of the first end of the first transistor with a voltage level of the first end of the second transistor to generate an error indicating signal from the output terminal.

According to still another exemplary embodiment of the present invention, an error detection method is provided. The error detection method is employed for detecting an error status of a driver circuit having at least a first transistor. A first end of the first transistor outputs a driving current The error detection method comprising: generating a reference voltage by applying a supplying voltage to a gate of a second transistor and applying a reference current to a first end of the second transistor; and generating an error indicating signal by comparing a voltage level of the first end of the first transistor with a voltage level of the first end of the second transistor.

These and other objectives of the present invention will no doubt become obvious to those of ordinary skill in the art after reading the following detailed description of the preferred embodiment that is illustrated in the various figures and drawings.

DETAILED DESCRIPTION

In the following, the present invention will be described with reference to various exemplary embodiments. It will be clear that various modifications and changes may be made thereto without departing from the broader spirit and scope of the invention. Furthermore, the following descriptions of various embodiments of the present invention accompanying with the drawings are for illustrative purposes only and shall not be treated as a limitation to the scope of the present invention. Furthermore, similar components and elements are designated with same references in the accompanied drawings may be of similar functions and operations.

Moreover, certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
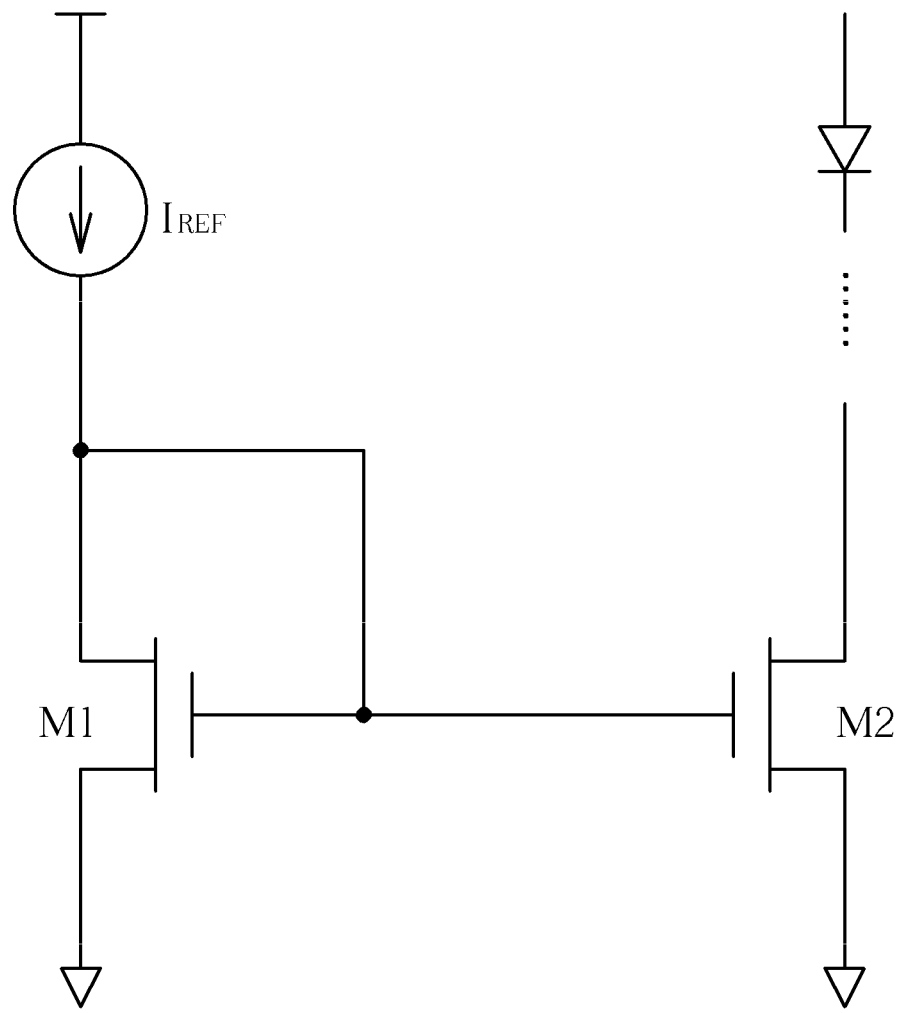
FIG. 1 is a circuit diagram of a current driver of the conventional art
Figure 2:
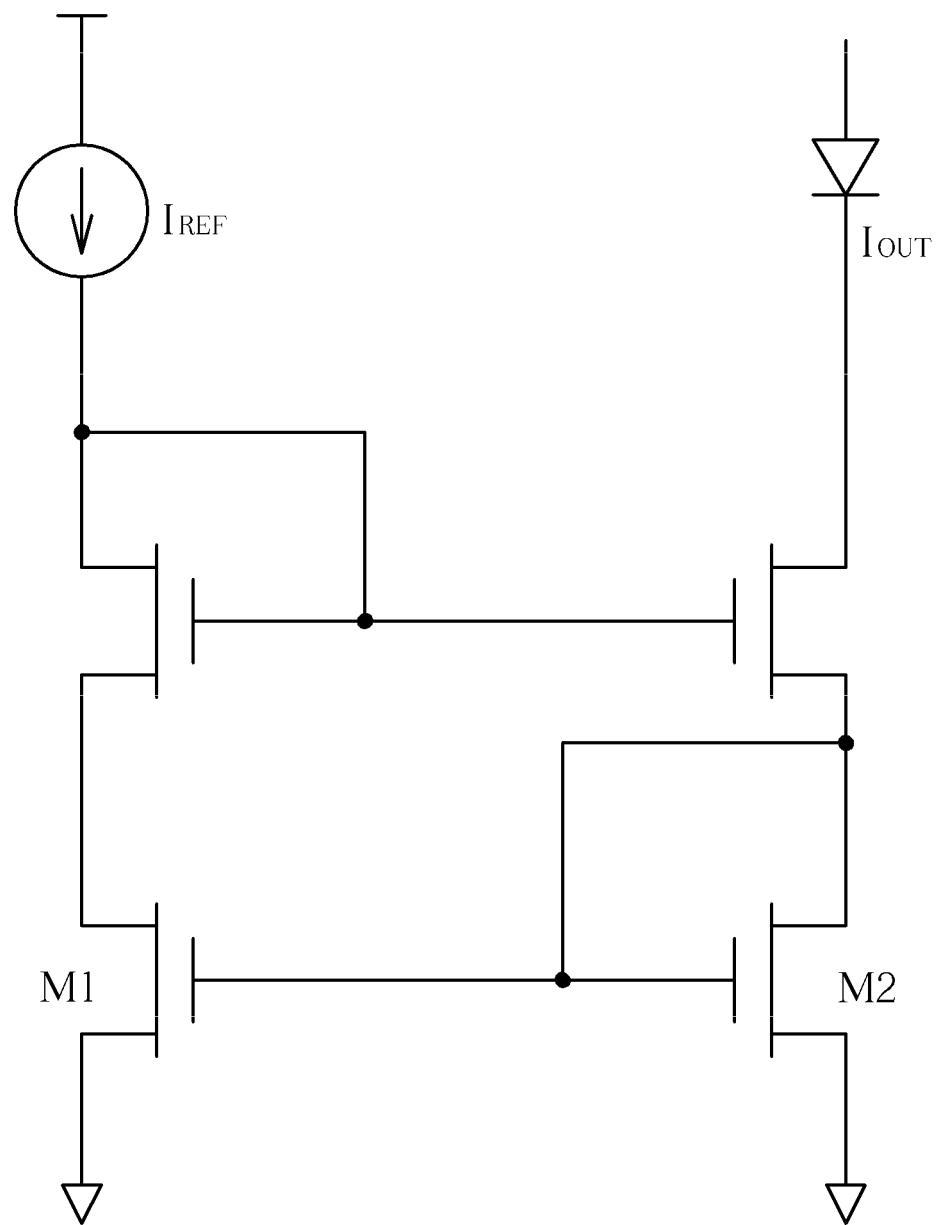
FIG. 2 is a circuit diagram of a cascoded current driver of the conventional art
Figure 3:
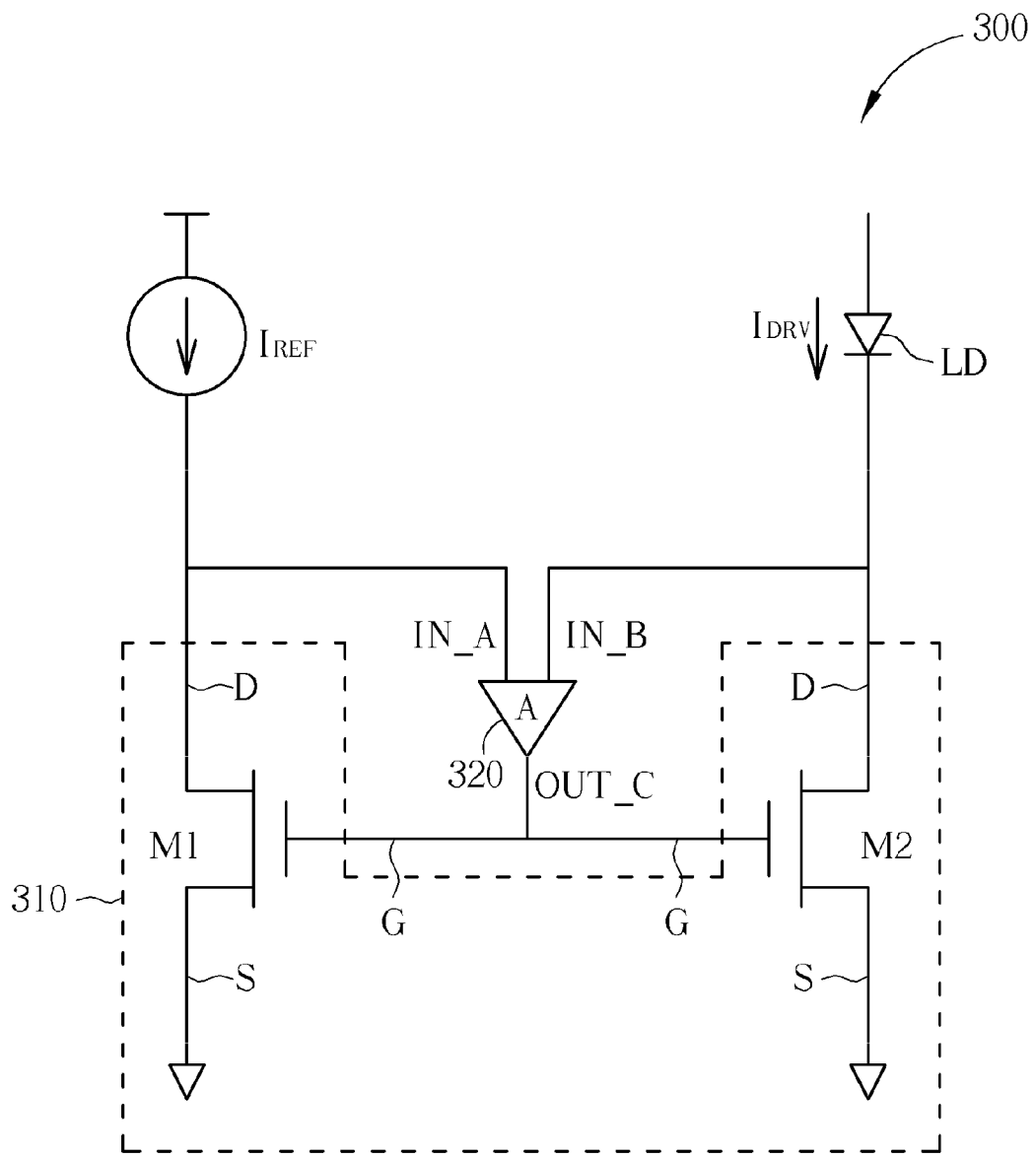
FIG. 3 is a circuit diagram of a driver circuit according to one exemplary embodiment of the present invention.

Please refer to FIG. 3 illustrating a circuit diagram of a driver circuit for driving a light-emitting device according to one exemplary embodiment of the present invention. As illustrated in FIG. 3, a driver circuit 300 includes a current mirror 310 and an amplifier 320 for the purpose of driving a light-emitting device LD. The inventive driver circuit 300 mainly employs the current mirror 310 to mirror a reference current $I_{REF}$ probably generated by a constant current source so as to generate a driving current $I_{DRV}$. With the help of the amplifier 320, the driving current $I_{DRV}$ is generated more preciously.

As illustrated in FIG. 3, the current mirror 300 has a first transistor M1 and a second transistor M2, each of which has a first end D, a second end S, and a control end G. The first transistor M1 is configured to receive the reference current $I_{REF}$ inputted at the first end D of the first transistor M1 while the second transistor M2 is configured to generate the driving current $I_{DRV}$ outputted at the first end D of the second transistor M2. In addition, the first end D of the second transistor M2 is directly connected to the light-emitting device LD. The amplifier 320 maintains corresponding voltages of ends of the transistors M1 and M2 in consistency, and includes a first input terminal IN_A, a second input terminal IN_B, and an output terminal OUT_C. The first input terminal IN_A is coupled to the first end D of the first transistor M2 while the second input terminal IN_B is coupled to the first end D of the second transistor M2. Further, the output terminal OUT_C is coupled to the control ends G of the first and second transistors M1 and M2. Due to the virtual short characteristic of the amplifier 320, the voltage levels of the first ends D of the first and second transistors M1 and M2 is substantially the same. Hence, in this exemplary embodiment, the reference current $I_{REF}$ is precisely mirrored, and according to the aspect ratios of the transistors M1 and M2, the driving current $I_{DRV}$ is generated. Due to smaller size and gate capacitance of the current mirror 310, higher response time is obtained. The terminal IN_A is also fedback to adjust the transconductance gm of the amplifier 320 to dynamically adjust the loop stability.

To achieve low output voltage, the second transistor M2 might be operated in the linear region, leading the driving current $I_{DRV}$ to be a function of an output voltage (i.e., the voltage level at the first end D of the transistor M2). One of the advantages provided by operating the second transistor M2 in the linear region includes the fact that the mismatch caused by the variations of threshold voltages of transistors M1 and M2 is reduced. This is because the current expression in the linear region is a function of ($V_{gate-source} - V_{threshold}$) instead of the square law in saturation region. In spite of this, the variation of $V_{drain-source}$ will increasingly affect the output current. Moreover, the loop gain of the driver circuit 300 will be reduced as the transistor M2 is operated in the linear region.

Figure 4:
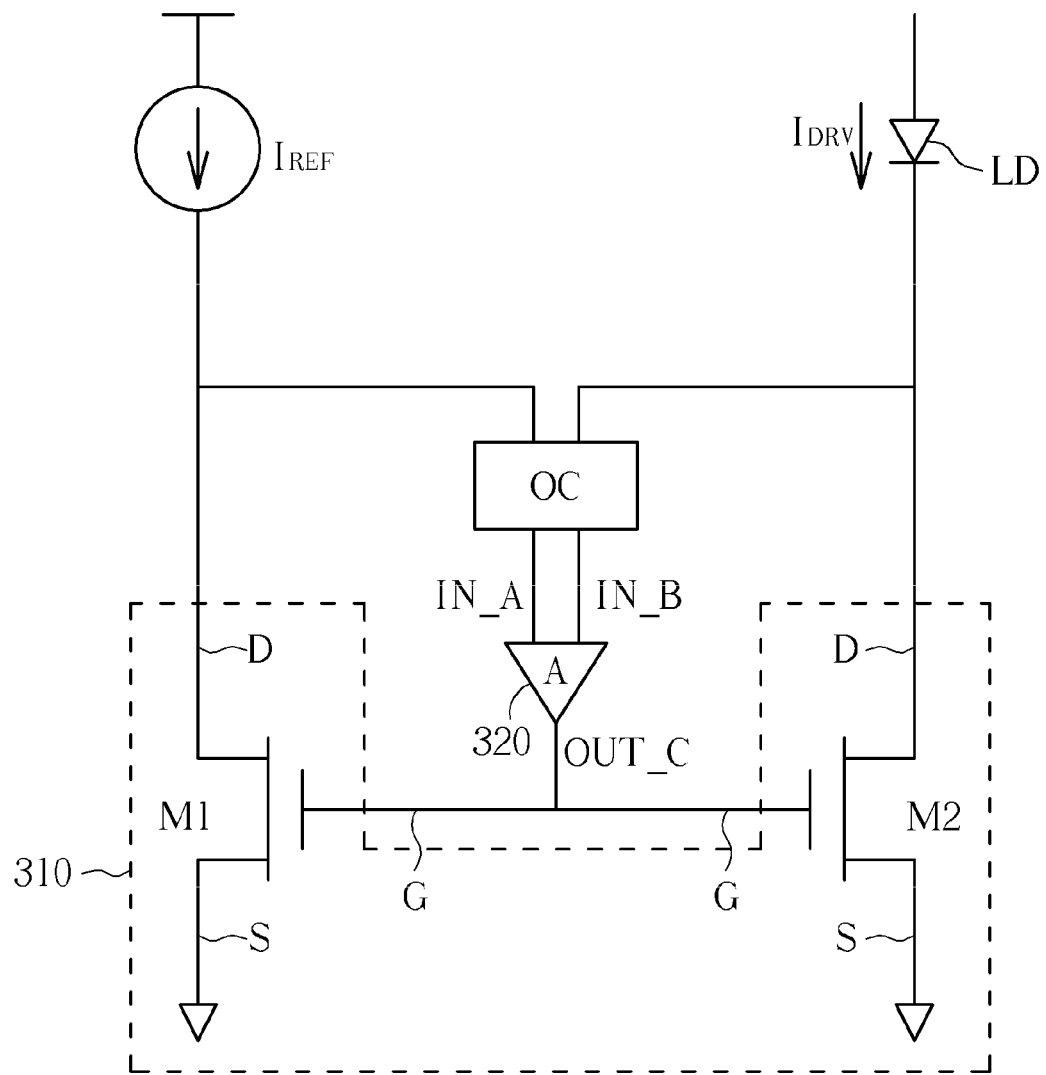
FIG. 4 is a conceptual circuit diagram of a driver circuit with an offset cancellation circuit according to one exemplary embodiment of the present invention.

In this regards, the offset of the amplifier 320 becomes a critical concern. In order to increase the loop gain and eliminate/cancel the offset of the amplifier 320, the present invention introduces an offset cancellation circuit into the inventive driver circuit according to one exemplary embodiment. One of such exemplary embodiments is conceptually illustrated in FIG. 4, in which an offset cancellation circuit OC is employed to cancel/eliminate an offset voltage of the amplifier 320. The offset cancellation circuit OC is coupled to the amplifier 320 and the current mirror 310.

In some exemplary embodiments of the present invention, the switching capacitor architecture may be adopted to implement the offset cancellation circuit. However, the invention is not restricted in scope to particular types of offset cancellation circuits. Any circuit capable of cancelling/eliminating the offset voltage of the amplifier 320 will suffice. A detailed circuit diagram regarding the offset cancellation circuit 330 based on the switching capacitor architecture is illustrated in FIG. 5 according to one exemplary embodiment of the present invention.

In this exemplary embodiment, an auto-zeroed offset cancellation technique is employed by using a differential input and single output amplifier 320 with one capacitive component 332 coupled in series with one input terminal of the amplifier 320. The offset cancellation circuit 330 is operated in two different phases: sense and store phase and operating phase. During the sense and store phase, the amplifier 320 is configured as a unit gain amplifier where a reference voltage is applied to the capacitive component 332. The offset voltage $V_{OS}$ of the amplifier 320 is then substantially identical to a voltage difference between an output terminal OUT_C and the input terminal IN_A of the amplifier 320, and hence the offset voltage $V_{OS}$ is sensed and stored in capacitive component 332, where $V_{OS}=V_{IN}-V_O$ (voltage levels respectively at input and output terminals of amplifier 320). Accordingly, during the operating phase, the offset voltage $V_{OS}$ is cancelled with the voltage stored in capacitive component 332 during the sense and store phase, thereby yielding the output voltage of the amplifier 320 identical to the input voltage of the amplifier 320. The offset cancellation circuit 330 is controlled by a switch device including SW11-SW13 to operate between two different phases.

Figure 5:
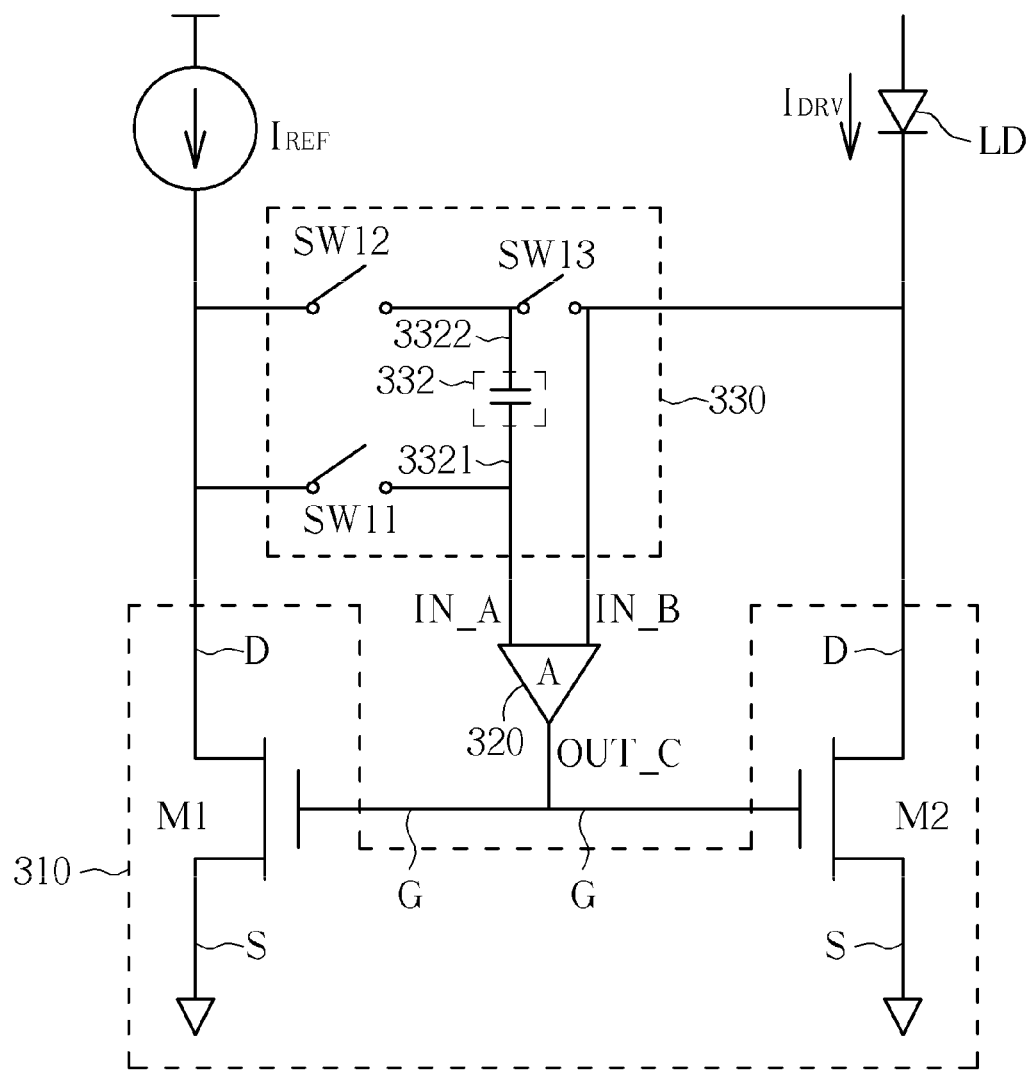
FIG. 5 is a detailed circuit diagram of the driver circuit shown in FIG. 4.

As illustrated in FIG. 5, the offset cancellation circuit 330 includes a capacitive component 332 and a switch device comprising a first switch SW11, SW 12, and SW 13. Capacitive component 332 has a first end 3321 and a second end 3322. The first end 3321 of the capacitive component 332 is coupled to the first input terminal IN_A of the amplifier 320. The first switch SW11 is coupled between the first end D of the first transistor M1 and the first end 3321 of the capacitive component 332, the second switch SW12 is coupled between the second end 3322 of the capacitive component 332 and the first end D of the first transistor M1, and a third switch SW13 is coupled between the second end 3322 of capacitive component 332 and the first end D of the second transistor M2. The capacitive component 332 is configured to sense and store the offset voltage when the first and the third switches SW11 and SW 13 are conductive (i.e., closed) and the second switch SW 12 is not conductive (i.e., opened). In the meantime, the offset voltage $V_{OS}$ is sensed and stored by utilizing the capacitive component 332. After the offset voltage $V_{OS}$ is stored and sensed in the capacitive component 332, the offset cancellation circuit 330 will be accordingly operated in the operating phase. In the meantime, the offset cancellation circuit 330 is configured to cancel/eliminate the offset voltage $V_{OS}$, where the second switch SW12 is conductive and the first and third switches SW11 and SW13 are not conductive. As a result, the offset voltage $V_{OS}$ is cancelled, and the driving current $I_{DRV}$ is more precisely generated due to the enhancement on the performance of the amplifier 320.

Figure 6:
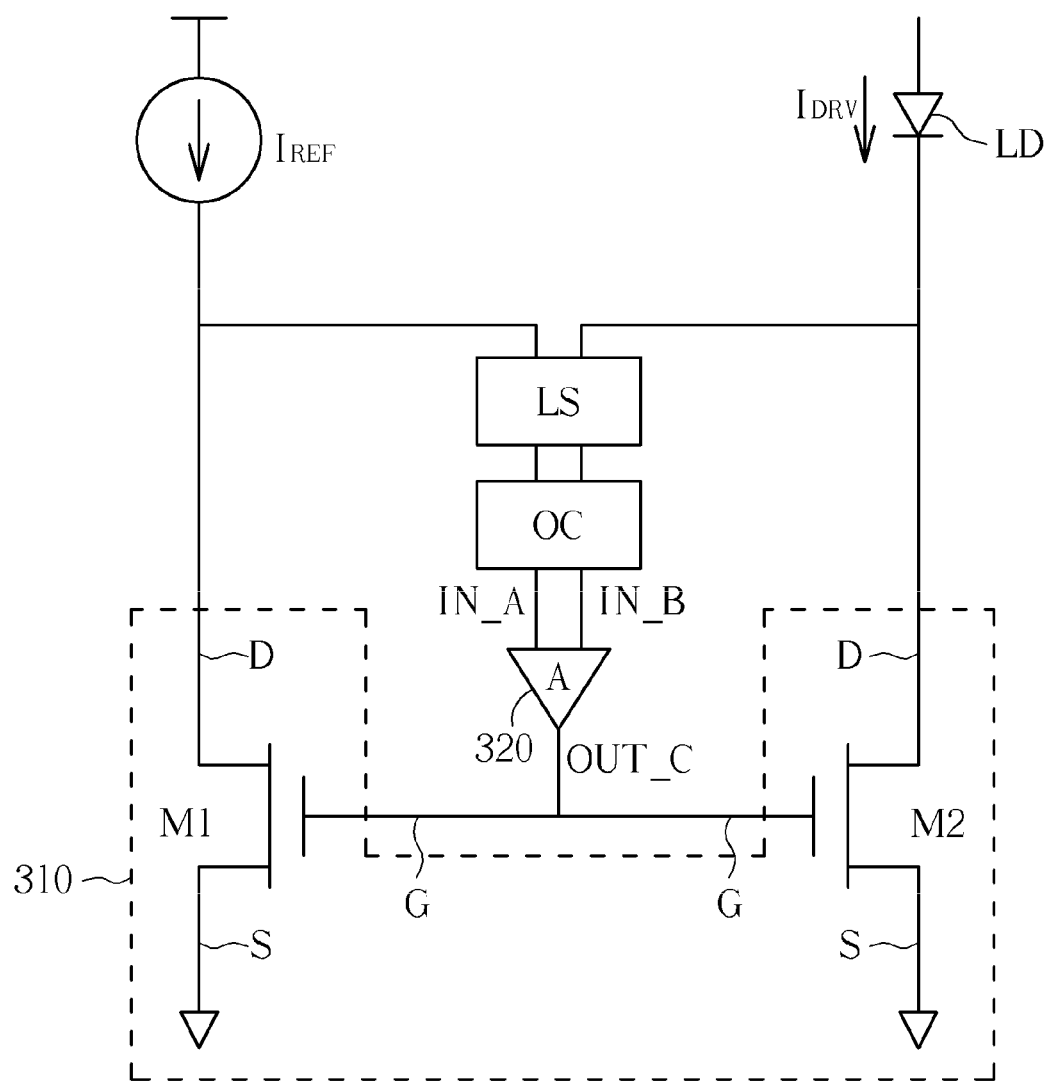
FIG. 6 is a conceptual circuit diagram of an inventive driver circuit including an offset cancellation circuit and a level shifter according to one exemplary embodiment of the present invention.
Figure 7:
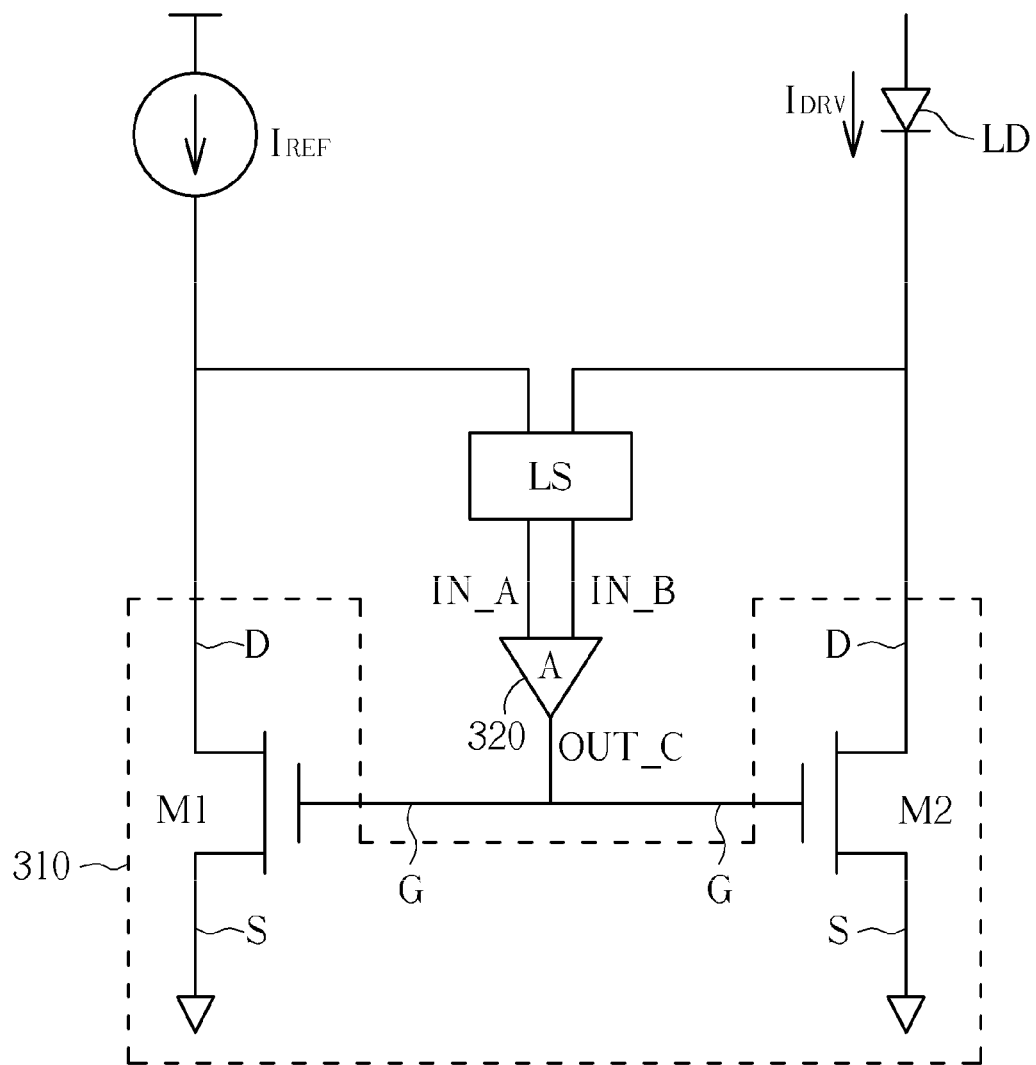
FIG. 7 is a conceptual circuit diagram of an inventive driver circuit including a level shifter according to one exemplary embodiment of the present invention.

In some applications, the output voltage of the driver circuit has to cover wide ranges. Hence, the input common mode range of the amplifier 320 is another critical concern. In this regards, the present invention further incorporates a level shifter into the inventive driver circuit, and a corresponding conceptual circuit diagram is illustrated in FIG. 6, where the level shifter is designated with "LS" while the offset cancellation circuit is designated with "OC". Bedside, in some other exemplary embodiments of the present invention, the inventive driver circuit may only include a level shifter without an offset cancellation circuit, which is conceptually illustrated in FIG. 7. In this exemplary embodiment, the level shifting circuit LS may be directly coupled to the amplifier 320 and the current mirror 310, and configured to apply a shifting voltage level $V_{LS}$ to the first and second input terminals IN_A and IN_B of the amplifier 320.

Usually, the addition of the level shifter may further add another pole to the whole system (i.e., the driver circuit), thereby leading to stability issues. Hence, the present invention introduces a special circuit configuration without introducing another pole. This approach is achieved by combining the offset cancellation circuit with the level shifter. Two different corresponding exemplary embodiments of an offset cancellation circuit and level shifting circuit and corresponding operation phases are respectively illustrated in FIGS. 8A-8C and FIGS. 9A-9C. The inventive offset cancellation and level shifting circuits 340 and 350, each of which is coupled to the amplifier 320 and the current mirror 310, and employed for applying a shifting voltage level $V_{LS}$ to the first and second input terminals IN_A and IN_B of the amplifier 320 and cancelling the offset voltage $V_{oS}$ of the amplifier 320. Commonly, the shifting voltage level $V_{LS}$ is an adequate potential so that the amplifier 320 can remain active unconditionally.

Figure 8A:
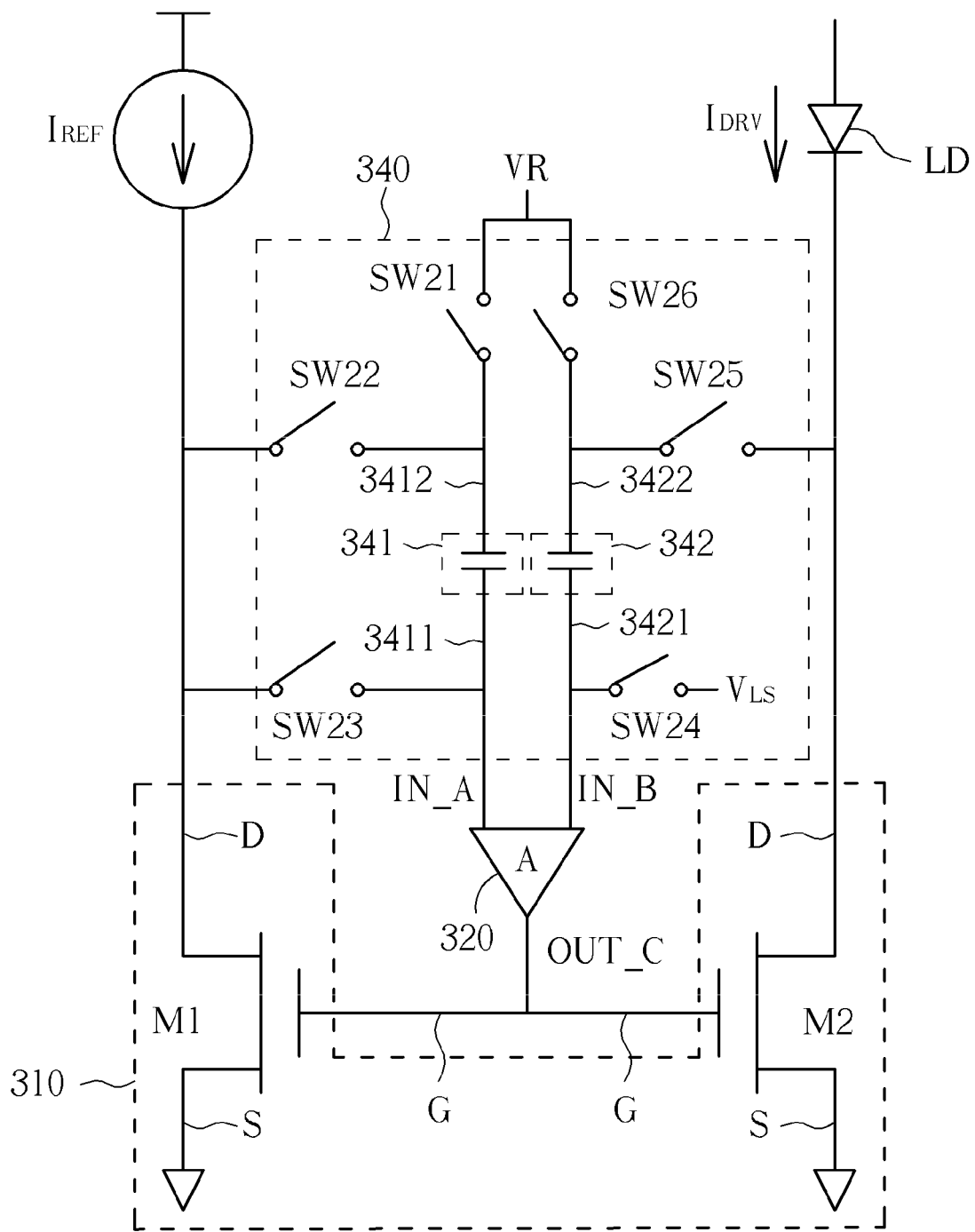
FIGS. 8A-8C is a detailed circuit illustrating the inventive driver circuit including an offset cancellation and level shifting circuit and corresponding phases according to one exemplary embodiment of the present invention.

As illustrated in FIG. 8A, the offset cancellation and level shifting circuit 340 comprises a first capacitive component 341, a second capacitive component 342, a voltage generator (not shown), and a switch device including switches SW21-SW26. The first capacitive component 341 has a first end 3411 and a second end 3412, wherein the first end 3411 of the first capacitive component 341 is coupled to the first input terminal IN_A of the amplifier 320. The second capacitive component 342 has a first end 3421 and a second end 3422, wherein the first end 3421 of the second capacitive component 342 is coupled to the second input terminal IN_B of the amplifier 320. The voltage generator is coupled to the second input terminal IN_B of the amplifier 320, and is utilized for generating the shifting voltage level $V_{LS}$. As illustrated, the first switch SW 21 is coupled between the second end 3412 of the first capacitive component 341 and a reference voltage VR, the second switch SW22 is coupled between the second end 3412 of the first capacitive component 341 and the first end D of the first transistor M1, the third switch SW23 is coupled between the first input terminal IN_A of the amplifier 320 and the first end D of the first transistor M1, the fourth switch SW24 is coupled between the second input terminal IN_B of the amplifier 320 and the voltage generator providing the voltage level $V_{LS}$, the fifth switch SW25 is coupled between the second end 3422 of the second capacitive component 342 and the first end D of the second transistor M2 and a sixth switch SW26 is coupled the reference voltage VR and the second end 3422 of the second capacitive component 342.

Figure 8B:
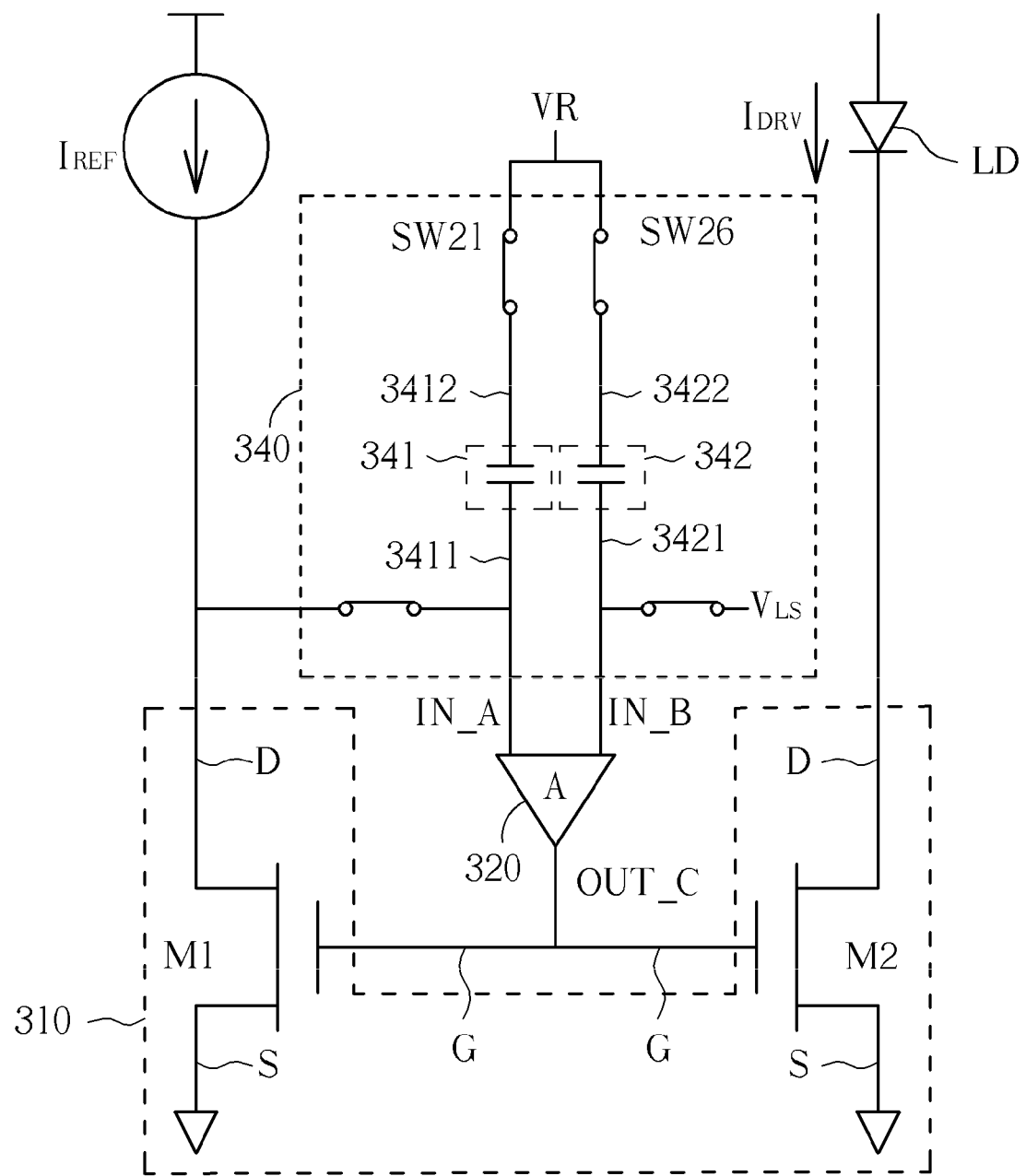
Figure 8C:
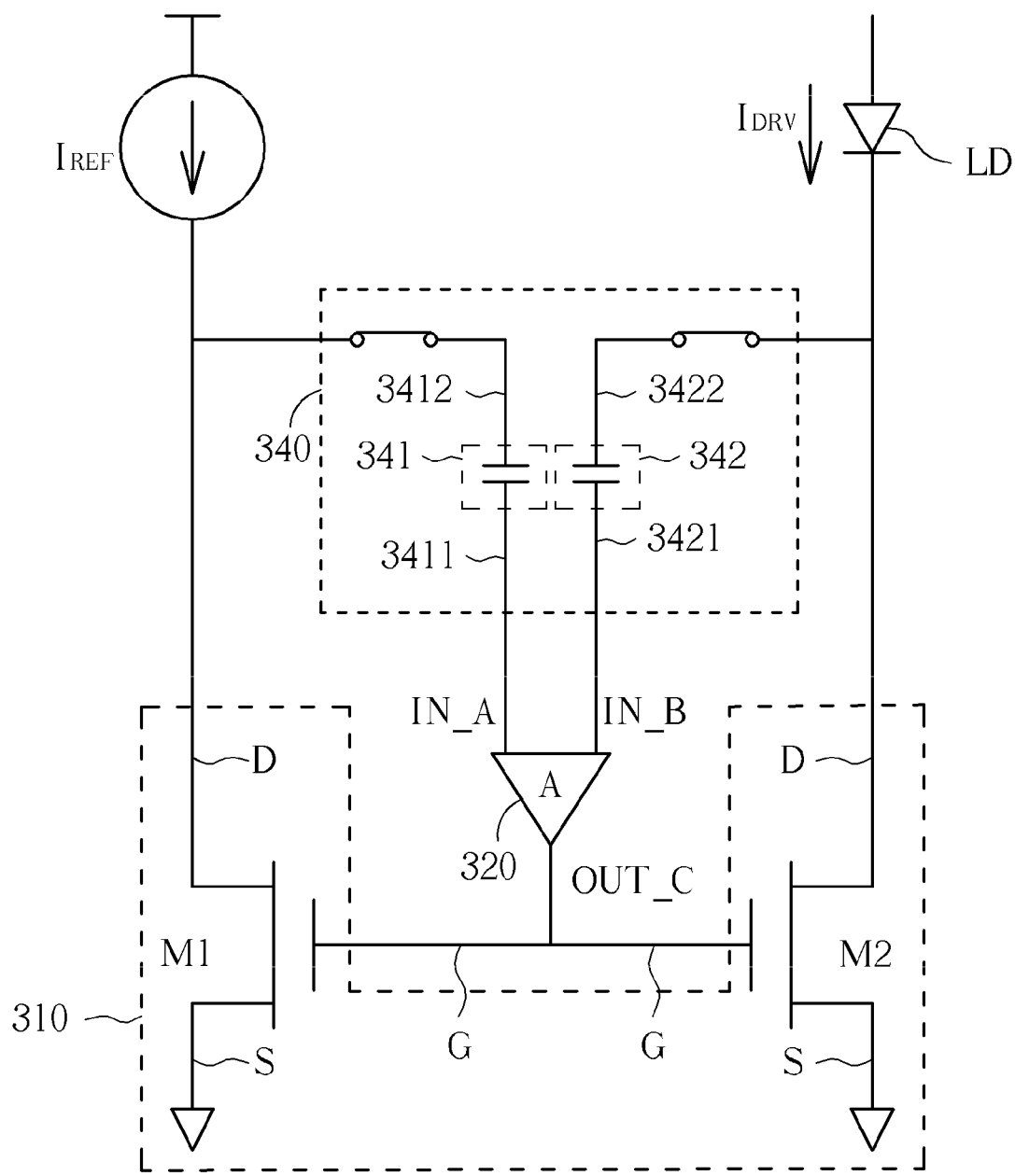

As illustrated in FIGS. 8B and 8C, the offset cancellation and level shifting circuit 340 is operated in sense and store phase and operating phase by switching the switch device. During the sense and store phase, the offset cancellation and level shifting circuit 340 is configured to sense and store the offset voltage $V_{OS}$ and the shifting voltage level $V_{LS}$ by utilizing the first and second capacitive components 341 and 342, where first, third, fourth and sixth switches SW21, SW23, SW24 and SW26 are conductive and other switches are not conductive. Accordingly, during the operating phase, the offset cancellation and level shifting circuit 340 is configured to cancel the offset voltage $V_{OS}$ and apply the shifting voltage level $V_{LS}$ to the first and second input terminals IN_A and IN_B of the amplifier 320 by utilizing the first and second capacitive components 341 and 342, where the second and fifth switches SW22 and SW 25 are conductive and other switches are not conductive.

Figure 9A:
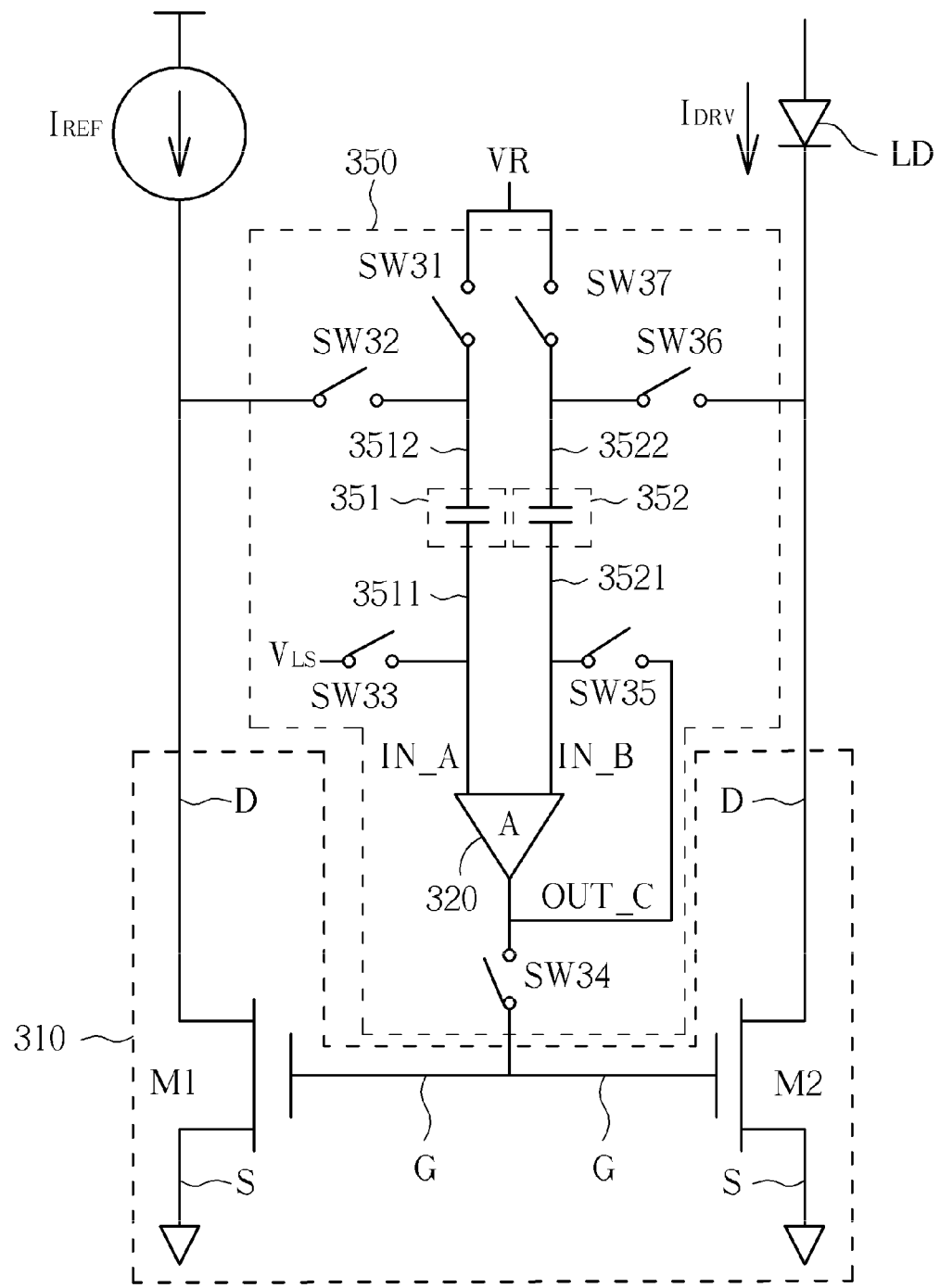
FIGS. 9A-9C is a detailed circuit illustrating the inventive driver circuit including an offset cancellation and level shifting circuit and corresponding phases according to another exemplary embodiment of the present invention.

Referring to FIG. 9A, FIG. 9A shows another exemplary embodiment of the offset cancellation and level shifting circuit of the present invention. Comparatively, one of the distinctions between the exemplary embodiment shown in FIG. 8A and the exemplary embodiment shown in FIG. 9A includes features that the offset cancellation and level shifting circuit 350 of FIG. 8A can achieve the offset cancellation and level shifting while the current mirror 310 concurrently generates the driving current $I_{DRV}$ to drive the light emitting device LD. This is because the offset cancellation and level shifting circuit 350 of FIG. 8A is operated during the sense and store phase with the switch SW34 opened, resulting in the floating of the offset cancellation and level shifting circuit 350. Hence, none of the transistors M1 and M2 will be involved with the cancellation and level shifting loop made up by the offset cancellation and level shifting circuit 350. As a result, the offset cancellation and level shifting circuit 350 can achieve the offset cancellation operation and level shifting operation without affecting the driving of the light-emitting device LD.

In particular, as illustrated in FIG. 9A, the offset cancellation and level shifting circuit 350 comprises a first capacitive component 351, a second capacitive component 352, a voltage generator (not shown), and a switch device including switches SW31-SW37. The first capacitive component 351 has a first end 3511 and a second end 3512, wherein the first end 3511 of the first capacitive component 351 is coupled to the first input terminal IN_A of the amplifier 320. The second capacitive component 352 has a first end 3521 and a second end 3522, wherein the first end 3521 of the second capacitive component 352 is coupled to the second input terminal IN_B of the amplifier 320. The voltage generator is coupled to the second input terminal IN_B of the amplifier 320, and employed for generating the shifting voltage level $V_{LS}$. As illustrated, the first switch SW31 is coupled between the second end 3512 of the first capacitive component 351 and a reference voltage VR, the second switch SW32 is coupled between the second end 3512 of the first capacitive component 351 and the first end D of the first transistor M1, the third switch SW33 is coupled between the first input terminal IN_A of the amplifier 320 and the voltage generator proving the voltage level $V_{LS}$, the fourth switch SW34 is coupled between the output terminal OUT_C of the amplifier 320 and the control end G of first transistor M1, the fifth switch SW35 is coupled between the output terminal OUT_C of the amplifier 320 and the second input terminal IN_B of the amplifier 320 the sixth switch SW36 is coupled between the second end 3522 of the second capacitive component 352 and the first end D of the second transistor M2, and a seventh switch SW 37 is coupled between the reference voltage VR and the second end 3522 of the second capacitive component 352.

The gate G of the first transistor M1 can be used as $V_{LS}$ to prevent charge sharing when offset cancellation mode is switched to normal mode and thus coupling back to the second capacitive component 352 leading error between the stored offset.

Figure 9B:
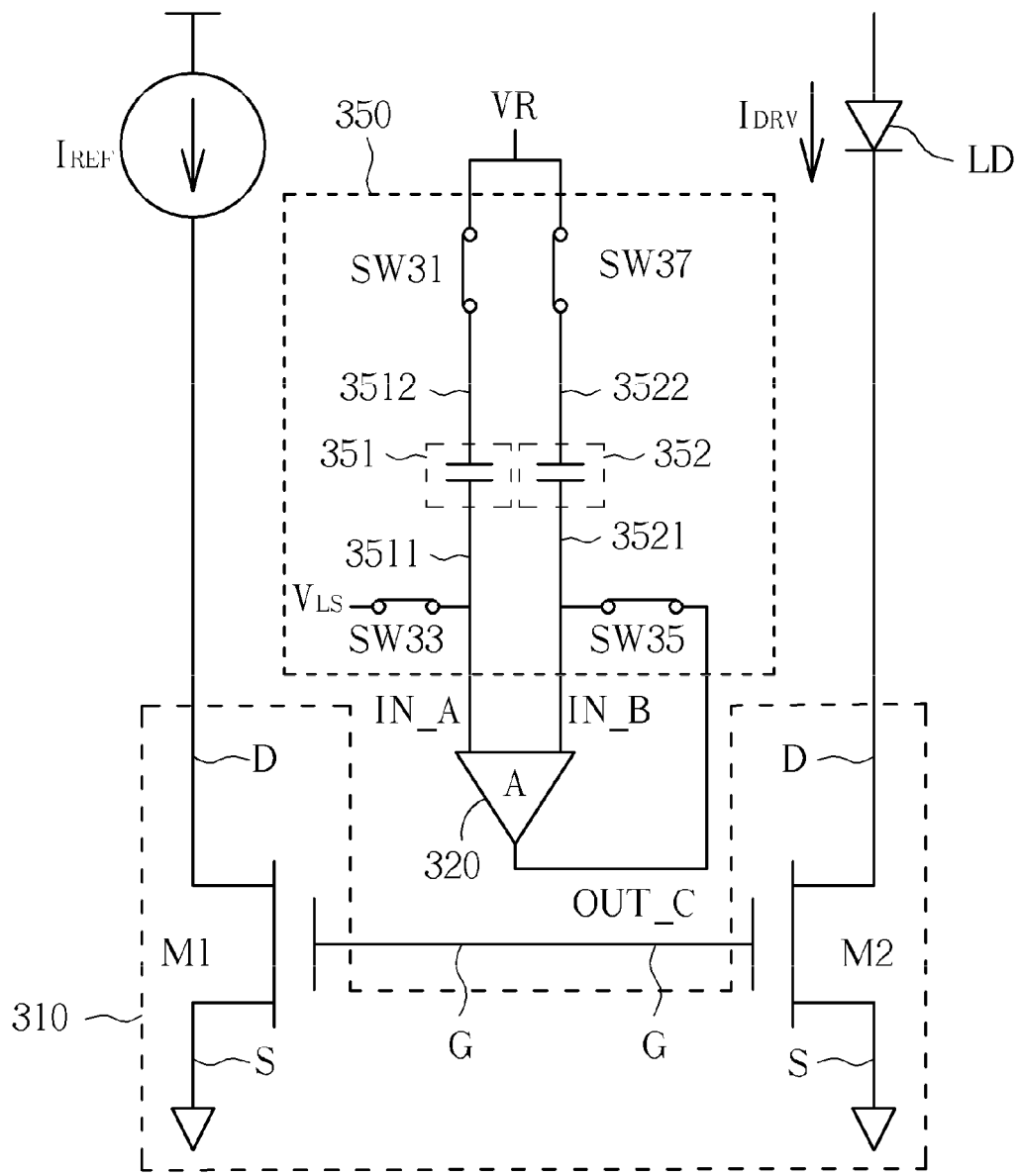
Figure 9C:
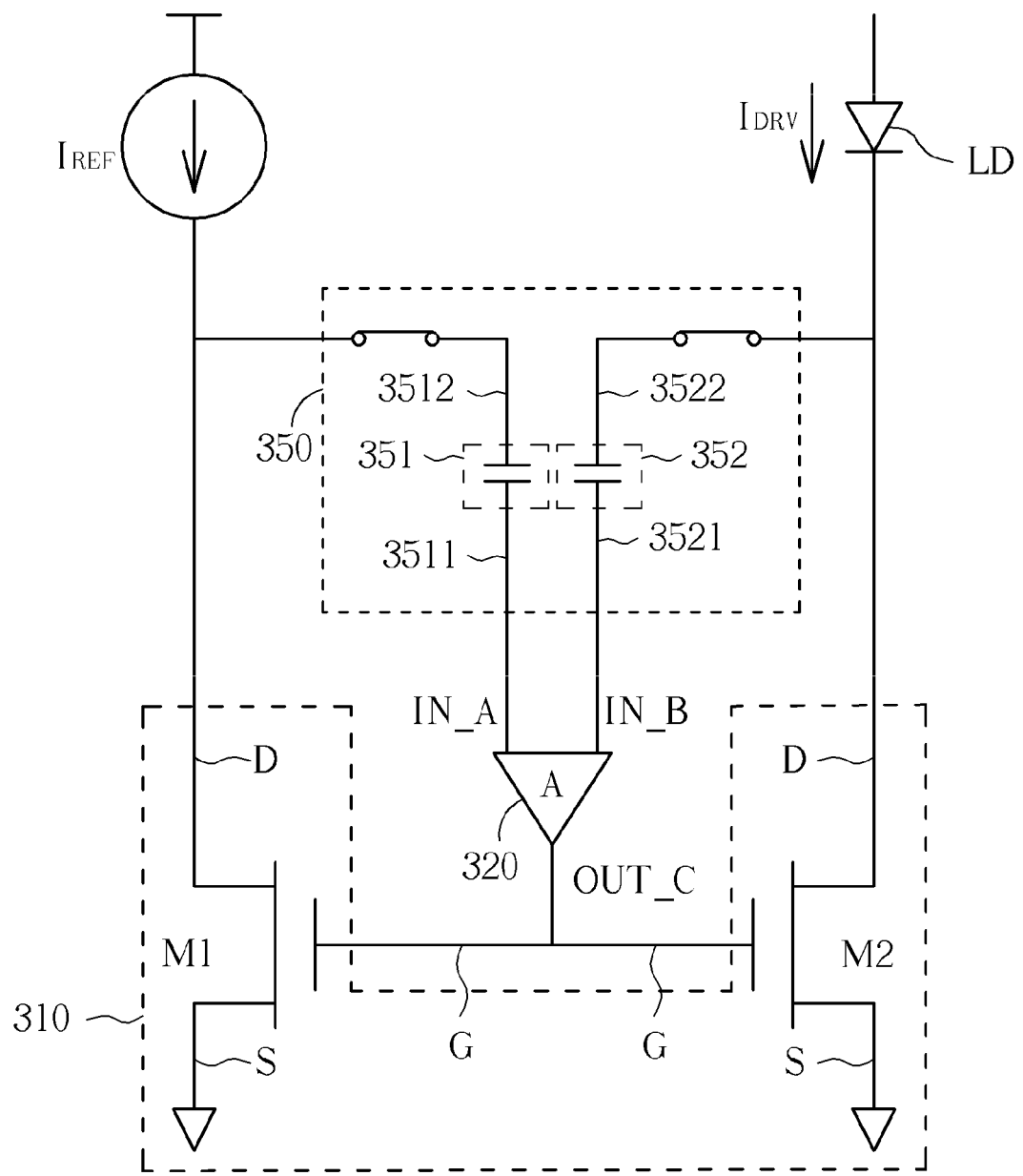

As illustrated in FIG. 9B, during the sense and store phase, the offset cancellation and level shifting circuit 350 is configured to sense and store the offset voltage $V_{OS}$ and the shifting voltage level $V_{LS}$ by utilizing the first and second capacitive components 351 and 352, where the first, third, fifth and seventh switches SW31, SW33, SW35 and SW37 are conductive and other switches are not conductive. Accordingly, as illustrated in FIG. 9C, during the operating phase, the offset cancellation and level shifting circuit 350 is further configured to cancel the offset voltage $V_{OS}$ and apply the shifting voltage level $V_{LS}$ to the first and second input terminals IN_A and IN_B of the amplifier 320 by utilizing the first and second capacitive components 351 and 352, where the second, fourth and sixth switches SW 32, SW 34 and SW 36 are conductive and other switches are not conductive.

Figure 10:
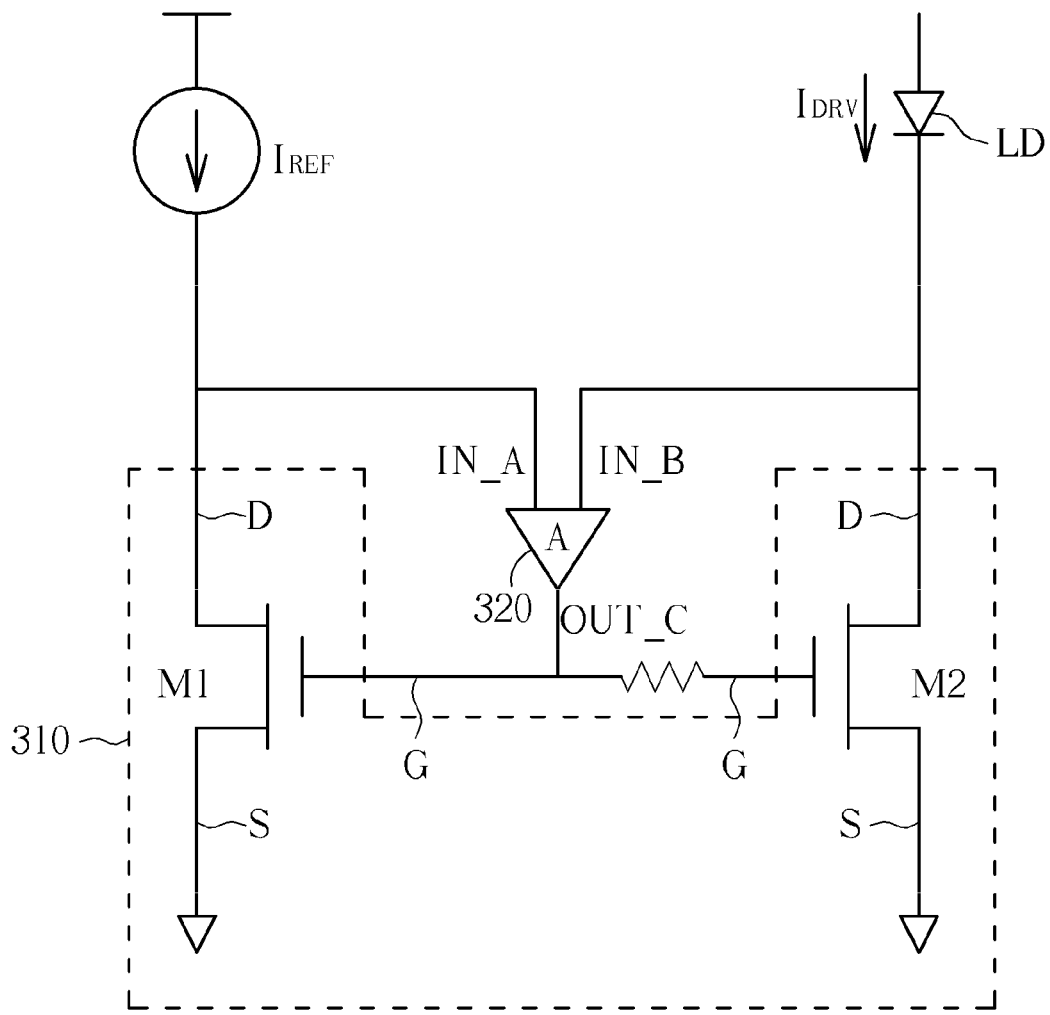
FIG. 10 is a circuit diagram showing the inventive driver circuit utilizing a zero nulling resistor according to one exemplary embodiment of the present invention.

Generally, the large driver circuit is, the larger gate capacitance introduces. The parasitic capacitance of the transistor of the driver circuit serves as the dominant pole of the whole system (i.e., the driver circuit) and determines the bandwidth of the driver circuit. In fact, the transistor of driver circuit contributes another high frequency pole to the driver circuit, and also moves to the low-frequency direction as the output voltage of the driver circuit increases. Hence, the second non-dominant pole becomes critical to determine the loop stability of the driver circuit. To assuring the stability of the inventive driver circuit, in some exemplary embodiments, the inventive driver circuit introduces a zero nulling resistor to couple to the gates of the transistors M1 and M2 of the driver circuit 300 to cancel the dominant pole. Such an exemplary embodiment is illustrated in FIG. 10, where a resistive component 311 is used, and coupled between the output terminal OUT_C of the amplifier 320 and the control end G of the second transistor M2. Consequently, the resistive component 311 and the gate parasitic capacitance of second transistor M2 will cause an additional zero, and a second non-dominant pole of the driver circuit 300 can be cancelled by properly selecting the resistance value of the resistive component 311.

Further, it is also proposed a dynamically adjustable loop stability scheme by feeding back the first input terminal IN_A in FIG. 10 to control the transconductance gm of amplifier 320. Therefore, in low output voltage condition, as the secondary pole moves to high frequency, loop bandwidth is dynamically shifted to higher frequency, thus increasing the slew rate. On the other hand, in high output voltage condition, the secondary pole and the loop bandwidth both move toward low frequency, increasing the stability.

Figure 11:
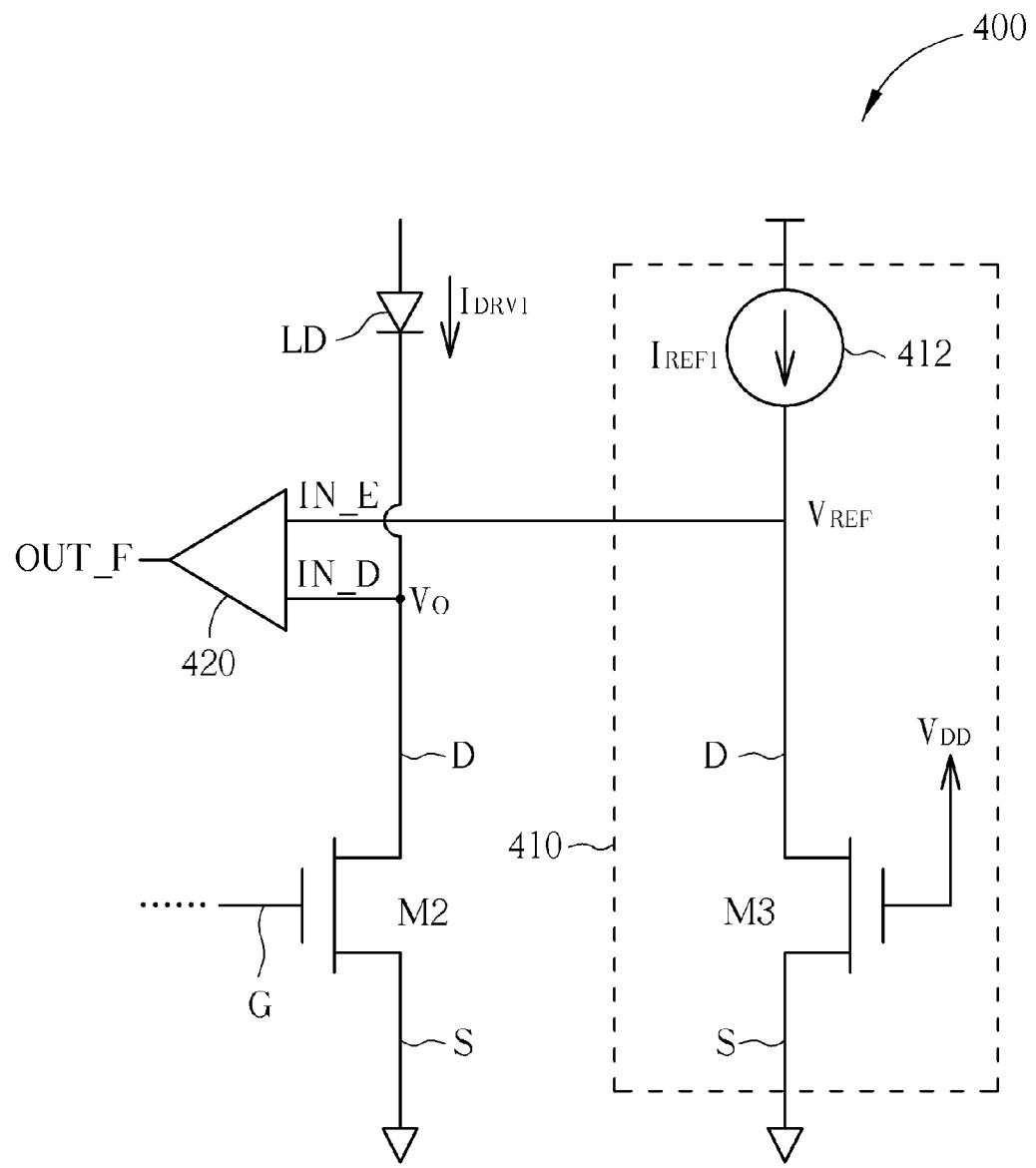
FIG. 11 is a circuit diagram of an error detecting circuit according to one exemplary embodiment of the present invention.

In addition, to assure the operational normality of the inventive driver circuit, the present invention further provides an error detection circuit to monitor the output voltage of the driver circuit (e.g. the voltage level at the first end D of the transistor M2 as shown in FIG. 3). The inventive error detection circuit generates an error indicating signal ALM indicative of an error status if the driver circuit cannot operate normally. In particular, the inventive error detection circuit detects whether the output voltage of the driver circuit is lower than a predetermined minimum value. If the output voltage of the driver circuit is lower than the predetermined minimum value, the driver circuit is deemed as malfunctioning. One of the exemplary embodiments of the inventive error detection circuit is illustrated in FIG. 11. As shown in FIG. 11, the error detection circuit 400 is employed for detecting the driver circuit (only the output part (M2) of driver circuit is shown) and includes a reference voltage generation circuit 410 and a comparator 420. The comparator 420 is employed for detecting whether the output voltage $V_O$ of the transistor M2 is lower than a predetermined minimum value. The predetermined minimum value is generated by the reference voltage generation circuit 410.

Accordingly, the reference voltage generation circuit 410 includes a transistor M3 and a reference current source 412 (which may be implemented with any types of constant current source). The transistor M3 has a first end D, a second end S and a control end G, wherein the control end G of the transistor M2 is coupled to a supply voltage $V_{DD}$ of the driver circuit. The reference current source 412 is coupled to the first end D of the transistor M3, and is configured to provide a reference current $I_{REF1}$ to the transistor M3. By applying the highest voltage level $V_{DD}$ of the power supply of the driver circuit, the first end D of the transistor M3 generates the predetermined minimum value (i.e., voltage level $V_{REF}$) which is also an allowable minimum value for the output voltage $V_O$ of the driver circuit.

Then, the output voltage $V_O$ is compared with the voltage level $V_{REF}$ by the comparator 420. The comparator 420 has a first input terminal IN_D, a second input terminal IN_E and an output terminal OUT_F, wherein the first input terminal IN_D is coupled to first end D of the transistor M2 to receive the output voltage $V_O$ while the second input terminal IN_E is coupled to first end D of the transistor M3 to receive the voltage level $V_{REF}$. Since the voltage level $V_{REF}$ is the allowable minimum value, the error indicating signal ALM generated from the output terminal OUT_F will be indicative of the error status of the driver circuit when the output voltage $V_O$ is lower than the voltage level $V_{REF}$. The amount of the reference current $I_{REF1}$ is determined according to the relationship between the aspect ratios of the transistors M2 and M3, and the amount of the driving current $I_{DRV1}$. For instance, if the aspect ratio of the transistor M2 is n times greater than that of the transistor M3, the driving current $I_{DRV1}$ will also be n times greater than the reference current $I_{REF1}$. Accordingly, the voltage level $V_{REF}$ is determined by such reference current $I_{REF1}$.

Based on the error detection circuit as mentioned above, the present invention further provides an error detection method. The inventive error detection method is employed for detecting an error status of a driver circuit which generates a driving current. The error detection method comprises: generating a reference voltage (e.g. voltage level $V_{REF}$) by applying a supplying voltage (e.g. reference voltage $V_{DD}$) to a gate of a second transistor (e.g. the transistor M3) and applying a reference current (e.g. reference current $I_{REF1}$) to a first end of the second transistor; and generating an error indicating signal by comparing a voltage level of the first end of a first transistor with a voltage level of the first end of the second transistor, where the first transistor may be output part of the driver circuit (e.g. the transistor M2). In addition, the error indicating signal is indicative of an error status of the driver circuit when the voltage level of the first end of the first transistor is smaller than the voltage level of the first end of the second transistor. The amount of the reference current is K times smaller than that of the driving current, and a size of the second transistor is K times smaller than a size of the first transistor Reference in the specification to "one exemplary embodiment" or "an exemplary embodiment" means that a particular feature, structure, or characteristic described in connection with the embodiment is included in at least an implementation. The appearances of the phrase "in one exemplary embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

In conclusion, the present invention utilizes an amplifier and a current to form the inventive driver circuit for providing a driving current with high accuracy. Since the performance of the amplifier is quite important for the accuracy of the driving current, the present invention further utilizes an offset cancellation circuit and/or a level shifter to enhance the performance of the amplifier. By the way, the present invention also provides an error detection circuit for assuring the operation normality of the inventive driver circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driver circuit for driving a light-emitting device, comprising:
a current mirror, having a first transistor and a second transistor, each having a first end, a second end, and a control end, wherein the first transistor is configured to receive a reference current at the first end of the first transistor, the second transistor is configured to generate a driving current at the first end of the second transistor, and the first end of the second transistor is directly connected to the light-emitting device; and
an amplifier, having a first input terminal, a second input terminal, and an output terminal, the first input terminal being coupled to the first end of the first transistor, the second input terminal being coupled to the first end of the second transistor, and the output terminal being coupled to the control ends of the first and second transistors.

2. The driver circuit of claim 1, further comprising:
an offset cancellation circuit, coupled to the amplifier and the current mirror, for cancelling an offset voltage of the amplifier.

3. The driver circuit of claim 2, wherein the offset cancellation circuit comprises:
a capacitive component, having a first end and a second end, the first end of the capacitive component being coupled to the first input terminal of the amplifier; and
a switch device, having a first switch coupled between the first end of the first transistor and the first end of the capacitive component, a second switch coupled between the second end of the capacitive component and the first end of the first transistor, and a third switch coupled between the second end of capacitive component and the first end of the second transistor;
wherein the capacitive component is configured to sense and store the offset voltage when the first and the third switches are conductive and the second switch is not conductive, and is further configured to cancel the offset voltage when the second switch is conductive and the first and third switches are not conductive according to the sensed and stored offset voltage.

4. The driver circuit of claim 1, further comprising:
an offset cancellation and level shifting circuit, coupled to the amplifier and the current mirror, for applying a shifting voltage level to the first and second input terminals of the amplifier and cancelling an offset voltage of the amplifier.

5. The driver circuit of claim 4, wherein the offset cancellation and level shifting circuit comprises:
a first capacitive component, having a first end and a second end, the first end of the first capacitive component being coupled to the first input terminal of the amplifier;
a second capacitive component, having a first end and a second end, the first end of the second capacitive component being coupled to the second input terminal of the amplifier;
a voltage generator, coupled to the second input terminal of the amplifier, for generating the shifting voltage level; and
a switch device, having a first switch coupled between the second end of the first capacitive component and a reference voltage, a second switch coupled between the second end of the first capacitive component and the first end of the first transistor, a third switch coupled between the first input terminal of the amplifier and the first end of the first transistor, a fourth switch coupled between the second input terminal of the amplifier and the voltage generator, a fifth switch coupled between the second end of the second capacitive component and the first end of the second transistor and a sixth switch coupled the reference voltage and the second end of the second capacitive component;

wherein the offset cancellation and level shifting circuit is configured to sense and store the offset voltage and the shifting voltage level by utilizing the first and second capacitive components when the first, third, fourth and sixth switches are conductive and other switches are not conductive, and is further configured to cancel the offset voltage and apply the shifting voltage level to the first and second input terminals of the amplifier by utilizing the first and second capacitive components when the second and fifth switches are conductive and other switches are not conductive.

6. The driver circuit of claim 4, wherein the offset cancellation and level shifting circuit comprises:
a first capacitive component, having a first end and a second end, the first end of the first capacitive component being coupled to the first input terminal of the amplifier;
a second capacitive component, having a first end and a second end, the first end of the second capacitive component being coupled to the second input terminal of the amplifier;
a voltage generator, coupled to the second input terminal of the amplifier, for generating the shifting voltage level; and
a switch device, having a first switch coupled between the second end of the first capacitive component and a reference voltage, a second switch coupled between the second end of the first capacitive component and the first end of the first transistor, a third switch coupled between the first input terminal of the amplifier and the voltage generator, a fourth switch coupled between the output terminal of the amplifier and the control end of first transistor, a fifth switch coupled between the output terminal of the amplifier and the second input terminal of the amplifier, a sixth switch coupled between the second end of the second capacitive component and a first end of the second transistor, and a seventh switch coupled between the reference voltage and the second end of the second capacitive component;

wherein the offset cancellation and level shifting circuit is configured to sense and store the offset voltage and the shifting voltage level by utilizing the first and second capacitive components when the first, third, fifth and seventh switches are conductive and other switches are not conductive, and is further configured to cancel the offset voltage and apply the shifting voltage level to the first and second input terminals of the amplifier by utilizing the first and second capacitive components when the second, fourth and sixth switches are conductive and other switches are not conductive.

7. The driver circuit of claim 1, further comprising:
a level shifting circuit, coupled to the amplifier and the current mirror, configured to provide a shifting voltage level to the first and second input terminals of the amplifier.

8. The driver circuit of claim 1, further comprising:
a resistive component, coupled between the output terminal of the amplifier and the control end of the second transistor, for providing a zero for the driver circuit.

* * * * *